Feb. 27, 1945. J. L. WILSON ET AL 2,370,609
CONCENTRATION CELL AND TEMPERATURE COMPENSATOR
Filed April 28, 1941 2 Sheets-Sheet 1

Inventors
John L. Wilson
Elwyn E. Mendenhall
By John E. Stryker Jr.
Attorney

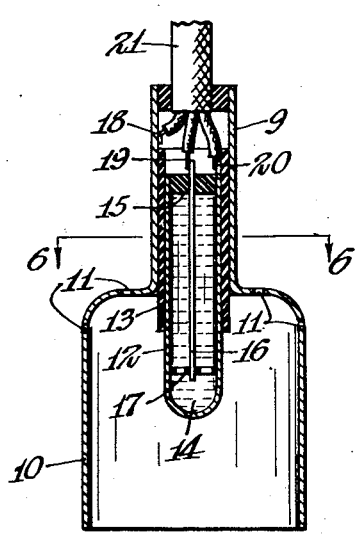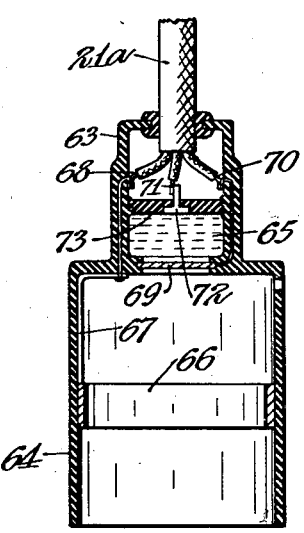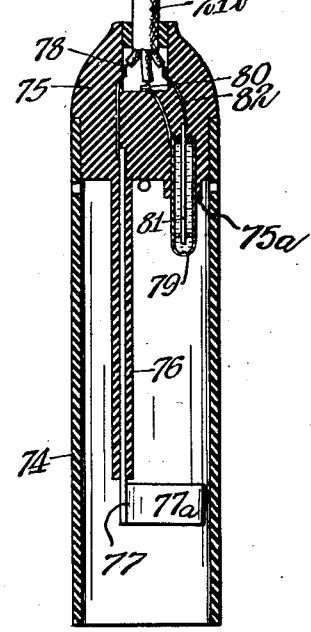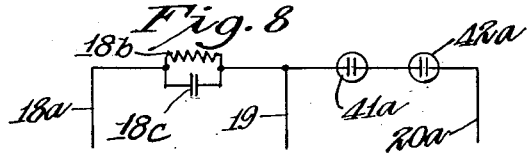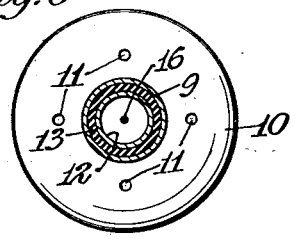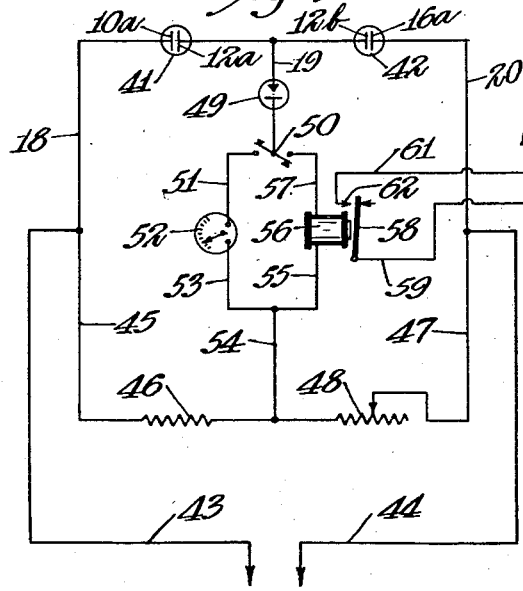
Inventors
John L. Wilson
Elwyn E. Mendenhall
By John E. Hughes Jr.
Attorney Patented Feb. 27, 1945

2,370,609

UNITED STATES PATENT OFFICE 2,370,609

CONCENTRATION CELL AND TEMPERATURE COMPENSATOR

John L. Wilson and Elwyn E. Mendenhall, St. Paul, Minn., assignors to Economics Laboratory, Inc., a corporation of Delaware Application April 28, 1941, Serial No. 390,786

4 Claims. (Cl. 175—183)

Our invention relates to apparatus for measuring or controlling, or both measuring and controlling, the concentration of solutions of such character that the electric conductivity thereof is affected by changes in concentration. Under the conditions frequently encountered in commercial use of such apparatus the temperature of the solution under examination fluctuates so that automatic temperature compensating means must be provided either for accurate measurement or accurate control of the concentration by automatically operating mechanism.

It is an object of this invention to provide a novel, unitary and unusually inexpensive combination conductivity cell and temperature compensator.

A further object is to provide apparatus of the class described which is particularly although not exclusively adapted for use in automatic control of detergent concentrations in dishwashing machines.

Another object is to provide a novel conductivity cell particularly adapted for use in solutions containing quantities of solid foreign matter, the electrodes having large surfaces which minimize errors due to the adherence of such solid matter thereto.

A still further object is to simplify the construction of a conductivity cell and temperature compensator by utilizing the interior of the compensating cell container as an electrode of the compensating cell and the exterior of the same cell container as an electrode in the measuring or conductivity cell.

Other objects will appear and be more fully pointed out in the following specification and claims.

In our device we promote accuracy and quick response to temperature variations by so constructing the measuring and temperature compensator cells that they react quickly to temperature changes and we so fix these cells relative to each other that both are exposed to the thermic influence of the fluid under examination at the same point or position in such fluid. Our unitary measuring and temperature compensating cells are of rugged construction and, in the preferred form, are of the dip type connected to electrical measuring or control apparatus by flexible conduits so that the position of these cells may be quickly and easily adjusted in any body of fluid under examination to operate most effectively and accurately under the particular conditions found in the several installations. By this device we also provide ready access to the conductivity cell electrodes for inspection and cleaning.

Referring to the accompanying drawings:

Fig. 3 is a central vertical section through a preferred form of our improved conductivity cell and temperature compensator;

Figs. 4 and 5 are similar sections through other preferred forms of the invention;

Fig. 6 is a horizontal section taken on the line 6—6 of Fig. 3;

Fig. 7 is a wiring diagram showing a bridge type of electrical measurement and control system suitable for use with our invention, and Fig. 8 illustrates a modification of the circuit illustrated in Fig. 7 for use when the solution of the temperature compensator cell has a temperature coefficient of conductivity of opposite mathematical sign to that of the solution under examination.

Figure 1:
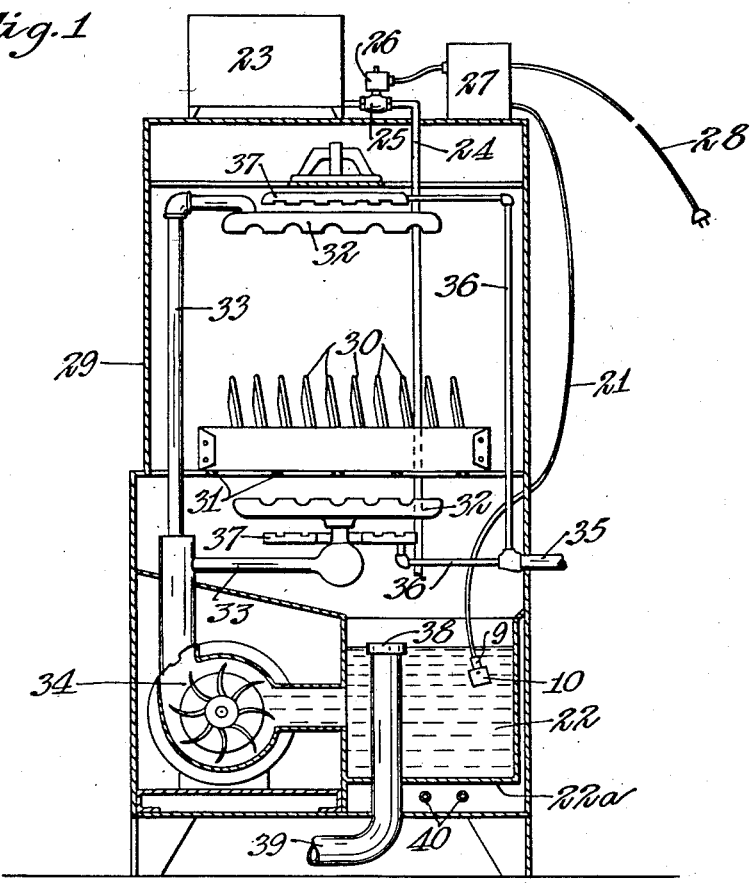
Figure 1 is a diagrammatic view illustrating our improved conductivity cell and temperature compensator in connection with electric apparatus for supplying a detergent to a dishwashing machine of common type.

Referring to Figs. 3 and 6, we provide a cylindrical casing 9 which is integral with a cylindrical shield 10 of relatively large diameter. The casing 9 and shield 10 are preferably constructed from a metal having good electrical conductivity and also characterized by being non-reactive to the solution to be tested or controlled. The lower end of the shield 10 is open and its upper portion has a number of perforations 11 in it to allow for the escape of air and other gases when the device is submerged in a body of liquid and to permit the circulation of the solution being measured. The interior of the shield 10 constitutes one electrode of our measuring cell and the other electrode of that cell is formed by a generally cylindrical tube 12 which projects into the shield and is separated by a sleeve 13 of insulating material from the casing 9. The tube 12 is filled with a standard solution 14 and the upper end of this tube is sealed by a body of insulating material 15. Extending axially within the tube 12 is an electrode 16 which is spaced and insulated from the tube near its lower end by a disk 17 and projects at the top through the insulating material 15. The area of the tube 12 which is exposed to the test solution in the measuring cell is adjusted to give this cell the desired cell constant and then the tube 12 is made fast or fixed relative to the casing 9 by suitable means, as by the use of an adhesive or by indenting the casing to firmly grip the sleeve 13 and tube.

An end of an electric circuit wire 18 is secured to the interior of the casing 9 at its upper end, a second circuit wire 19 is connected to the electrode 16 and a third circuit wire 20 is connected to the tube 12. This tube may be constructed from metal similar to that forming the casing 9 and shield 10 and must be non-reactive to the solution contained in it. As hereinbefore described, the exterior of the tube 12 constitutes one of the electrodes of the measuring cell and it will be understood that the interior of the same tube constitutes an electrode of the compensating or standard cell so that both of these electrodes may be connected in circuit by the single wire 20. The wires 18, 19 and 20 extend through a flexible conduit 21 adapted to freely suspend the electrodes in the solution to be tested and controlled.

In dishwashing machines it is common practice to provide a tank of wash water containing a detergent in solution and to spray this solution on the dishes after which the latter are rinsed by spraying them with hot rinse water. The used rinse water is usually collected in the wash solution tank where it causes some dilution and change in the temperature of the body of wash solution. A portion of the wash solution passes to waste through an overflow pipe each time the relatively clear rinse water enters the wash solution tank. As the successive racks of dishes are passed through the machine the washing and rinse cycle is repeated and after each cycle a quantity of detergent should be added to the wash solution to retain as nearly as practical a uniform concentration of detergent therein and to replace the detergent which is wasted to overflow and also that which reacts in each cycle with certain constituents of food washed from the dishes. For best results the concentration of detergent in the wash solution should be maintained within fairly narrow limits. Concentrations below the predetermined degree produce ineffectual washing and concentrations above the higher limit result in unnecessarily large losses of detergent in the overflow to waste during each cycle of operation, without improving the effectiveness of the washing operation and in some cases decreasing the effectiveness of the solution. By the use of the present invention, we maintain the concentration of detergent in the wash solution within effective limits automatically and effect economies in the use of detergent.

A suitable arrangement of our invention relative to a dishwashing machine is illustrated diagrammatically in Fig. 1 in which a body of wash solution is indicated by the numeral 22 and a tank 23 is provided to contain a liquid detergent or a concentrated solution of the detergent which is to be supplied to the wash solution. Communicating with the bottom of the tank 23 is an outlet pipe 24 having a control valve 25 adapted to be operated by a small electric motor or solenoid 26. Electrical circuits and apparatus for operating the valve 25 are contained in a casing 27 and power for operating such apparatus may be supplied through a circuit cord 28 adapted to be plugged into a suitable outlet. Details of a preferred circuit are hereinafter described.

The dishwashing machine illustrated in Fig. 1 has a housing 29 in which racks of dishes 30 may be placed on supports 31. Top and bottom wash sprays 32 are arranged to be supplied with wash solution under pressure through branch pipes 33 from a motor driven pump 34, the suction intake of this pump being in communication with the body of wash water 22. Hot rinse water is supplied from a pipe 35 having branches 36 extending to the top and bottom rinse sprays 37. In the operation of the dishwashing machine, the dishes 30 are washed by operating the pump 34 for a predetermined period of time and then the pump is stopped and the dishes are rinsed by supplying relatively hot rinse water from the sprays 37. The rack of rinsed dishes is then removed and replaced by a succession of other racks of dishes to be washed. Rinse water from each cycle of operation dilutes the wash solution and causes some of the latter to overflow to waste in the stand pipe 38 and waste pipe 39. The stand pipe 38 has its intake opening within the tank 22a at such elevation as to maintain the desired body of wash solution therein. It is thus apparent that the concentration of detergent in the wash solution is progressively reduced both by its reaction with the food washed from the dishes and due to the rinse dilution and waste to overflow. By our invention we automatically replace such losses of detergent and maintain the concentration within effective limits.

A suitable Wheatstone bridge type circuit and electrical apparatus for operating the solenoid 26 of the valve 25 to effect such control of solution concentration is illustrated in Fig. 7. A small electric motor may be substituted for the solenoid 26 to operate the valve. As here illustrated, the standard or temperature compensating cell is indicated generally by the numeral 42 and the conductivity measuring cell by the numeral 41. A unitary construction of these cells has been hereinbefore described and the alternate forms illustrated in Figs. 4 and 5 will be hereinafter described. For use in the circuit shown in Fig. 7, the cells 41 and 42 are designed to have equal temperature coefficients of conductivity. Further referring to this diagram, an electrode 10a represents the shield 10, an electrode 12a represents the exterior of the tube 12, electrode 12b represents the interior of the tube 12 and an electrode 16a represents electrode 16 of Fig. 3. Current is supplied to opposite sides of the bridge circuit by power wires 43 and 44 and the arm of the bridge containing the cell 41 includes the circuit wire 18 connected to wire 43 and the arm including the cell 42 includes the wire 20 connected to wire 44. Another arm of the bridge circuit extending from the wire 43 includes a wire 45 and resistor 46 and the opposite arm includes a wire 47 and a variable resistor 48. The bridge circuit proper includes the wire 19, a rectifier 49, a double throw switch 50, a wire 51 connected to one terminal of said switch, an indicating meter 52 and wire 53 constituting a branch of wire 54. Another branch 55 of wire 54 extends to the coil of a relay 56 in circuit with a wire 57 connected to another terminal of switch 50. The bridge wire 54 connects with the arms respectively including the resistors 46 and 48.

The relay 56 has a spring armature 58 normally engaging a back contact. A circuit wire 59 connects the armature 58 with the solenoid 26 of the detergent supply valve 25 and this solenoid is included in circuit with power supply wires 60 and 61, the latter of which extends to the make or front contact 62 of the armature 58. The resistors 46 and 48 have temperature coefficients of conductivity equal to zero or of negligible value. The adjustments necessary to place the bridge in balance are made with the cells 41 and 42 immersed in the solution to be examined and with the proper or desired concentration of that solution. The operation of the invention will be understood from the following description having particular reference to the control of detergent concentration in a dishwashing machine.

Alternating current is supplied by the power wires 43 and 44 and the cells 41 and 42 are submerged in the wash solution or other solution, the conductivity of which is to be measured or controlled. If it is desired to measure the concentration of the solution, the switch 50 is actuated to place the meter 52 in its branch of the bridge circuit. A deficiency of detergent in the solution under examination increases the resistance of cell 41 (between the electrodes 10 and 12 of Fig. 3) and causes the bridge circuit to be unbalanced so that current flows in the closed meter circuit, including the rectifier 49 and meter 52. The degree of deficiency of solution concentration is indicated by this meter 52.

To automatically control the concentration of the wash solution in the dishwashing machine the power wires 60 and 61 are connected to a suitable source of power and the switch 50 is actuated to place in circuit the branch of the bridge containing the relay 56. Now any deficiency in concentration will cause current to flow in the bridge circuit through the coil of the relay 56 which is thereby energized and the armature 58 is actuated to close the circuit including the solenoid 26. This opens the valve 25 and allows concentrated detergent solution to flow to the washing solution until the conductivity of the latter is increased to a point where the bridge circuit is again in balance. When this occurs, the armature 58 returns to its back contact to break the solenoid circuit and stop flow of detergent to the machine.

It will be understood that the standard solution must be properly related to the solution to be measured. In the foregoing description it is assumed that the temperature coefficients of conductivity of the standard solution and solution to be measured have like mathematical signs. For example, where detergents of the trisodium phosphate type are used, the compensating cell may contain a solution of monosodium dihydrogen phosphate, disodium monohydrogen phosphate or trisodium phosphate. Such standard solutions and test solutions have similar molecular structures. The solutions may, however, have temperature coefficients of conductivity of opposite mathematical sign in which case the bridge circuit may be modified as indicated in Fig. 8. For example, if the solution to be measured contains a polar solvent, then the compensating or standard cell may comprise a solution containing a non-polar solvent.

In the modification of the circuit illustrated in Fig. 8 a measuring cell indicated by the numeral 41a and a temperature compensator cell indicated by the numeral 42a are arranged in series in the same arm 20a of the bridge circuit rather than in opposite arms, as in Fig. 7. This change necessitates the inclusion of a suitable impedance in the branch 18a, such, for example, as the resistor 18b in parallel with a condenser 18c. Other portions of the circuits and apparatus may be identical with Fig. 7. This modified arrangement may be used with a solution of the temperature compensator cell 42a having a coefficient of conductivity of opposite mathematical sign to that of the solution under examination. The measuring cell 41a may be provided with electrodes, such as the shield 10 and tube 12 shown in Fig. 3, or other types, such as the alternate forms now to be described.

In the form of the invention shown in Fig. 4, a cylindrical casing 63 is molded integrally with a cylindrical shield 64, both of these parts being constructed from a plastic material of electrical insulating character and one which will not be attacked by the solution to be examined or by the standard or compensating solution. A chamber is formed in the lower part of the casing 63 to contain a standard solution 65. An annular electrode 66 is fixed within the shield 64 and is connected to a conductor or wire 67 extending in a passage formed in the casing 63 and making connection with a circuit wire 68. A metallic disk 69 forms the bottom of the chamber for the solution 65 and constitutes an electrode both for the measuring cell and standard cell. The disk 69 is connected to a circuit wire 70 and another circuit wire 71 is connected to an electrode 72 fixed centrally in the top of the standard cell. This electrode 72 is imbedded in a closure 73 which is inserted and sealed after filling the chamber with solution 65. The circuit wires 68, 70 and 71 are contained in a flexible conduit 21a similar to the conduit 21.

The cell structure shown in Fig. 5 has a shield 74, the upper end of which is closed by a head 75. These members may be constructed from soft or hard rubber or from other suitable material of electrical insulating character and one which is nonreactive to the solutions in which it is to be used. The shield 74 is a long and relatively narrow tube, open at its lower end and having its upper end fitting in telescoping relation to the lower part of the head 75, the entire shield being readily separable from the head to allow access to the electrodes within for cleaning or other purposes. An insulating sheath 76 projects down from the head 75 to contain an electrode 77 of the measuring cell. The lower end of the electrode 77 projects from its insulating sheath and its area may be increased by attaching a member 77a. Its upper end is connected to a circuit wire 78. A small standard or temperature compensating cell is mounted at one side of the member 76 on the head 75 and comprises a metallic tube 79 projecting from the bottom of the head 75 and containing a standard solution and an electrode 81, the latter having a circuit wire 82 connected to its upper end. The exterior surface of the tube 79 constitutes one of the electrodes of the measuring cell, the interior surface of the tube constitutes an electrode of the standard cell and both of these electrodes may be connected in circuit by a wire 80. The circuit wires 78, 80 and 82 are contained in a flexible conduit 21b which may be extended to the electric control apparatus, as in the case of conduit 21.

It will be evident that the electrode 77 and tube 79 are supported on the head 75 independently of the shield 74 so that the latter is free to be removed without disturbing the electrodes. Since the exposed lower end of the electrode 77 and its extension 77a are spaced substantially vertically and longitudinally of the shield from the electrode comprising the tube 79, the measured resistance of any solution under test is not affected by the proximity of the walls or bottom of the tank, notwithstanding the fact that the gap between these electrodes is great and the tank is constructed from metal as is usually the case in dishwashing machines.

The advantages of this arrangement will be evident when it is considered that the lower end of the shield should be open to prevent accumulations of foreign matter therein and the vertical spacing of the electrodes permits wide spacing and consequent greater accuracy of measurement, depending on the resistance of the solution under test, without resorting to a shield of relatively great width or depth. With lateral or horizontal spacing of the electrodes a much more bulky shield or casing would be required in order to provide equal spacing of electrodes in an open bottom shield.

Food accumulations in the wash solution rise to the surface and some of these light solids and greases enter the shield 74 and are caught on the bottom surface of the head 75. To keep accumulations of such substances away from the electrode 79, we provide a guard extension 75a of insulating material around the upper end portion of this electrode. The lower end of the insulating sleeve 13, shown in Fig. 3, is also arranged to project within the shield 10 around the electrode 12 for a similar purpose.

Either of the dip type electrodes illustrated in Figs. 4 and 5, or their equivalent within the scope of our invention, may be substituted for that illustrated in Fig. 3 in the electric measuring and control circuits.

Figure 2:
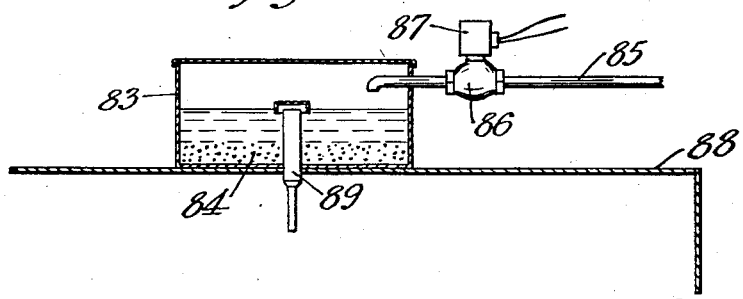
Fig. 2 illustrates, partially in vertical section and partially in elevation, a suitable dispenser for forming a concentrated solution and feeding it under control to a dishwashing machine or tank containing the solution to be measured or controlled.

Referring to Fig. 2, a dispenser tank 83 adapted to be charged with a detergent 84 is illustrated. A quantity of the detergent in dry state may be charged into this tank which has a removable cover for that purpose. The tank 83 is supplied with water through a pipe 85 under control of a solenoid valve 86. The solenoid 87 of this valve may be connected in circuit in a manner similar to the solenoid 26 shown in Fig. 7 so that water is supplied to the tank 83 automatically when the detergent is to be supplied to the dishwashing machine or to a tank indicated at 88 in Fig. 2. A stand pipe 89 is adapted to receive concentrated detergent solution which overflows into the upper end of said stand pipe and flows by gravity from its lower end into the tank 88 or washing machine.

It will be understood that the detergent or other chemical is not necessarily supplied as a solution or liquid but may be fed to the tank in the form of tablets, powder or paste by suitable modification of the dispensing mechanism hereinbefore described.

Our several forms of combination conductivity and temperature compensating cells illustrated in Figs. 3, 4 and 5 are simple and inexpensive to manufacture. They all utilize the interior of the compensating cell container as an electrode for that cell and the exterior of the same cell container as an electrode of the measuring conductivity cell. A further advantage of the electrodes shown in Figs. 3, 4 and 5 resides in the fact that they have large areas which minimize the effects of ordinary deposits of foreign matter which occur within the shield when particles of food are allowed to collect in the washing solution. The effect of food deposits is further reduced by the guard extensions, such as the member 75a. It will also be evident that the electrode surfaces of the measuring cell are readily accessible within the protecting shield and the unitary cell structures are readily removable from the wash solution so that they may be quickly and easily cleaned when cleaning is desirable. Our standard or temperature compensating cells are located so that they are subject to the same thermal conditions as the measuring cells and each has a large area of the container for the standard solution which is exposed to the local thermal conditions and transmits heat rapidly to and from the contained solution.

Having described our invention, what we claim as new and desire to protect by Letters Patent is:

1. A dip type cell of the class described comprising a supporting head for electrodes, a temperature compensating cell mounted on said head and having a metallic outer wall adapted to constitute a measuring electrode, a vertically elongated, tubular shield, open at its lower end and removably fitting said head at its upper end, said electrode being disposed within said shield, a second measuring electrode supported on said head independently of said shield and in downwardly spaced relation to said first mentioned electrode within said shield, said shield being readily removable from said head to allow access to the measuring electrodes and means for suspending said head in a tank.

2. A dip type cell of the class described comprising a supporting head for electrodes, a temperature compensating cell mounted on said head and having a metallic outer wall adapted to constitute a measuring electrode, a vertically elongated tubular shield, open at its lower end and closed at its upper end by said head, said electrode being disposed within said shield, a second measuring electrode supported within the lower end portion of said shield in downwardly spaced relation to said first electrode, circuit wires extending upward from said electrodes, temperature compensating cell and head and a flexible conduit containing said circuit wires to freely suspend said head in various positions in a tank.

3. In a concentration control and temperature compensating device adapted to be submerged in a tank containing a solution subject to changes in conductivity and temperature, a conductivity measuring cell including an elongated cylindrical casing open at only one extremity thereof, and a surface portion disposed between the open and closed extremities of said casing serving as one electrode of said conductivity measuring cell; a temperature compensating cell within said casing, said temperature compensating cell including a metal tube, the exterior surface of said metal tube being spaced from said first-mentioned electrode and serving as the second electrode of said conductivity measuring cell, the interior surface of said metal tube serving as one electrode of said temperature compensating cell; a standard solution in said metal tube; an electrode extending into said standard solution and serving as the second electrode of said temperature compensating cell; means electrically insulating said last-mentioned electrode from said metal tube; means electrically insulating said first-mentioned electrode from said metal tube; electric circuit wires connected with said first-mentioned electrode, said metal tube, and said last-mentioned electrode, respectively; and a flexible conduit containing said circuit wires adapted to freely suspend said casing in various positions in said tank.

4. In a concentration control and temperature compensating device adapted to be submerged in a tank containing a solution subject to changes in conductivity and temperature, a conductivity measuring cell including an elongated cylindrical casing open at only one extremity thereof, and a surface portion disposed between the open and closed extremities of said casing serving as one electrode of said conductivity measuring cell; a temperature compensating cell within said casing, said temperature compensating cell including a metallic member within said casing arranged to confine a body of standard solution, the exterior surface of said metallic member being spaced from said first-mentioned electrode and serving as the second electrode of said conductivity measuring cell, the interior surface of said metallic member serving as one electrode of said temperature compensating cell; a standard solution confined in said casing by said metallic member; an electrode in contact with said standard solution and serving as the second electrode of said temperature compensating cell; means electrically insulating said last-mentioned electrode from said metallic member; electric circuit wires connected with said first-mentioned electrode, said metallic member, and said last-mentioned electrode, respectively; and a flexible conduit containing said circuit wires adapted to freely suspend said casing in various positions in said tank.

JOHN L. WILSON.
ELWYN E. MENDENHALL.